United States Patent [19]

Kumakawa

[11] Patent Number: 4,835,055

[45] Date of Patent: May 30, 1989

[54] REINFORCED RUBBER ARTICLE

[75] Inventor: Shiro Kumakawa, Matsuyama, Japan

[73] Assignee: Teijin Limited, Osaka, Japan

[21] Appl. No.: 122,601

[22] Filed: Nov. 18, 1987

Related U.S. Application Data

[63] Continuation of Ser. No. 833,951, Feb. 27, 1986, abandoned.

[30] Foreign Application Priority Data

Mar. 6, 1985 [JP] Japan ................................. 60-42597

[51] Int. Cl.$^4$ .......................... B32B 9/00; D02G 3/00
[52] U.S. Cl. .................................... 428/378; 152/556;
428/292; 428/293; 428/295; 428/390; 428/395
[58] Field of Search ............... 428/375, 378, 390, 395, 428/373, 292, 293, 294, 295; 152/359

[56] References Cited

U.S. PATENT DOCUMENTS

| | | | |
|---|---|---|---|
| 3,251,913 | 5/1966 | Richards et al. | 264/343 X |
| 3,307,971 | 3/1967 | Kurtz | 428/395 |
| 3,459,627 | 8/1969 | Vosburgh . | |
| 3,464,852 | 9/1969 | Caldwell et al. | 428/395 |
| 3,546,008 | 12/1970 | Shields et al. | 428/395 |
| 3,940,544 | 8/1976 | Marshall et al. | 428/395 |
| 4,098,864 | 7/1978 | Morris et al. | 264/289.6 |
| 4,352,925 | 10/1982 | Petke et al. . | |
| 4,438,178 | 3/1984 | Powers | 428/395 |
| 4,572,863 | 2/1986 | Chung | 428/395 |

FOREIGN PATENT DOCUMENTS

| | | | |
|---|---|---|---|
| 58-41912 | 11/1983 | Japan | 428/373 |
| 60-104521 | 8/1985 | Japan | 428/373 |
| 714502 | 9/1984 | United Kingdom . | |

OTHER PUBLICATIONS

Chemical Abstract, vol. 81, 1974.
Chemical Abstracts, vol. 99, 1983.

*Primary Examiner*—Lorraine T. Kendell
*Attorney, Agent, or Firm*—Burgess, Ryan & Wayne

[57] ABSTRACT

A polyester fiber highly heat-resistant in a rubber matrix and useful as a reinforcing material for rubber articles, has a tensile strength of 8 g/d or more and is composed of a core portion made from a polyester resin and a skin portion made from a polyester resin and covering the core portion, the skin portion being in an amount of 5% to 20% based on the entire amount of the fiber and having a lower orientation and/or lower crystallinity than the core portion, which polyester fiber has been produced by treating a surface portion of a homogeneous polyester fiber consisting essentially of a polyester resin with a solvent capable of swelling the polyester resin or by coating a precursory polyester fiber for the core portion with a polyester resin for the skin portion.

3 Claims, No Drawings

REINFORCED RUBBER ARTICLE

This application is a continuation of application Ser. No. 833,951, filed Feb. 27, 1986 abandoned.

BACKGROUND OF THE INVENTION

1. Field of the Invention

The present invention relates to a polyester fiber having a core-in-skin composite structure. More particularly, the present invention relates to a polyester fiber having a core-in-skin composite structure exhibiting excellent heat resistance in a rubber matrix and therefore being useful as a reinforcing material for rubber articles.

2. Description of the Related Art

It is well known that various rubber articles are reinforced by polyester fibers, nylon 6 fibers, nylon 66 fibers, or regenerated cellulose (rayon) fibers.

Especially, polyester fibers, typically polyethylene terephthalate fibers, exhibit advantageous physical properties, for instance, high tensile strength, high Young's modulus, low ultimate elongation and low creep and therefore, are adequate as a reinforcing material for the rubber articles. However, conventional polyester fibers are disadvantageous in their inferior bonding (adhering) property to rubber materials compared with conventional nylon 6 or 66 fibers. Therefore, the conventional polyester fibers do not exhibit a satisfactory bonding property to the rubber material as a reinforcing material. Also, when conventional polyester fibers are used as a reinforcing material for the rubber materials, the polyester polymer is sometimes hydrolyzed or aminolyzed with water or an amine contained in the rubber material. This phenomenon causes the heat resistance and bonding strength of the reinforcing polyester fibers in the rubber material to decrease.

Accordingly, it is believed that the heat resistance of the conventional polyester fibers embedded in a rubber matrix is lower than that of nylon 6 or 66 fibers.

Japanese Unexamined Patent Publication (Kokai) No. 56-140128 discloses a rubber-reinforcing material consistiing of core-in-sheath type composite fibers composed of a polyester core constituent and a polyamide sheath constituent, which composite fibers exhibit an enhanced bonding property to the rubber materials.

The above-mentioned type of composite fibers are, however, disadvantageous in that while the composite fiber-reinforced rubber articles are actually used, the polyester core constituent and the polyamide sheath constituent split from each other. This phenomenon results in a poor reinforcing effect of the composite fibers to the rubber material.

SUMMARY OF THE INVENTION

An object of the present invention is to provide a polyester fiber having enhanced heat resistance in a rubber matrix and therefore useful as a reinforcing material for rubber articles.

Another object of the present invention is to provide a polyester fiber highly heat-resistant in a rubber material, which has improved resistances to hydrolysis and aminolysis and is therefore useful as a reinforcing material for rubber articles.

The above-mentioned objects are attained by the polyester fiber of the present invention which has a tensile strength of 8 g/d or more and which is composed essentially of a core portion consisting essentially of a polyester resin and a skin portion covering the core portion and consisting essentially of a polyester resin, which skin portion is in an amount of from 5% to 20% based on the entire weight of the fiber and exhibits at least one of a lower degree of orientation and a lower degree of crystallinity than the core portion.

DESCRIPTION OF THE PREFERRED EMBODIMENTS

The polyester fiber of the present invention is composed of a core portion consisting essentially of a polyester resin and extending along the longitudinal axis of the fiber and a skin portion covering the core portion and consisting essentially of a polyester resin.

In the polyester fiber of the present invention, it is preferable that each of the polyester resins for the core portion and the skin portion consist essentially of a polycondensation product of a carboxylic acid component consisting of from 50 to 100 molar% of at least one aromatic dicarboxylic acid and 0 to 50 molar% of at least one other carboxylic acid with a glycol component consisting of from 50 to 100 molar% of ethylene glycol and 0 to 50 molar% of at least one other diol component.

The above-mentioned aromatic dicarboxylic acid is preferably selected from the group consisting of terephthalic acid, isophthalic acid, naphthalene dicarboxylic acid, diphenyl dicarboxylic acid, and diphenylether dicarboxylic acid, and dianhydrides and diacidchlorides of the above-mentioned dicarboxylic acids. In the above-mentioned dicarboxylic acids, two carboxylic acid radicals are directly attached to an aromatic cyclic nucleus. The most preferable aromatic dicarboxylic acid is terephthalic acid.

The other carboxylic acid comonomer is selected from the group consisting of aromatic dicarboxylic acids different from those usable in the amount of from 50 to 100 molar%; aliphatic dicarboxylic acids, for example, oxalic acid, malonic acid, succinic acid, adipic acid, sebacic acid, and decane dicarboxylic acid; cycloaliphatic dicarboxylic acids, for example, hexahydroterephthalic acid, decalin dicarboxylic acid, and tetralin dicarboxylic acid; glycolic acid; and p-hydroxybenzoic acid.

The other diol compound usable for the glycol component is preferably selected from the group consisting of aliphatic diols different from ethylene glycol, for instance, trimethylene glycol, prophylene glycol, 1,4-butane diol, 1,3-butane diol, neopentyl glycol, and 1,6-hexane diol; cycloaliphatic diols, for instance, cyclohexane dimethylol and tricyclodecane dimethylol; and aromatic diols, for instance, bisphenol A, bisphenol S, bishydroxyethoxybisphenol A, and tetrabromobisphenol A.

The polyester resins usable for the core and skin portions of the polyester fiber may contain 10% by weight or less of an additive, for example, an additional polymer resin other than the polyester and a stabilizer.

The polyester fiber of the present invention indispensably has a tensile strength of 8.0 g/d or more. When the tensile strength is less than 8 g/d, the resultant polyester fiber exhibits an unsatisfactory reinforcing effect for the rubber material.

The polyester fiber of the present invention is composed of a core portion and a skin portion. The core portion extends along the longitudinal axis of the polyester fiber. The skin portion is in the form of a skin layer covering the core portion and in an amount of from 5% to 20% based on the entire weight of the polyester fiber.

The skin portion has a lower degree of orientation and/or a lower degree of crystallinity than the core portion. This feature is effective for enhancing the heat-resistance of the resultant polyester fibers in a rubber matrix.

If the amount of the skin portion is more than 20% based on the entire weight of the polyester fiber, the resultant polyester fiber exhibits an unsatisfactory tensile strength of less than 8 g/d and an insufficient reinforcing effect on the resultant rubber article.

If the skin portion is in a small amount of less than 5% by weight, the reinforcing effect of the resultant polyester fiber on the rubber articles is poor.

The polyester fiber of the present invention having the core-in-skin composite structure may have been prepared (1) by treating a surface (skin) portion of a homogeneous polyester fiber consisting essentially of a polyester resin with a solvent capable of swelling the polyester resin, (2) by coating a precursory polyester fiber for the core portion with a polyester resin for the skin portion, or (3) by modifying the surface (skin) portion of a homogeneous polyester fiber consisting essentially of a polyester resin by means of irradiation of ultraviolet rays or electron beams or by means of plasma treatment.

In the preparation of the polyester fiber of the present invention, a surface (skin) portion of a polyester fiber is treated with a solvent capable of swelling the polymer resin. This swelling treatment is effective for decreasing the degree of orientation and/or the degree of crystallinity of the skin portion. The swelling solvent preferably consists of at least one member selected from a o-chlorophenol, benzyl alcohol, nitrobenzene, m-cresol, phenol-tetrachloroethane mixtures, phenol-xylene mixtures, dichloroacetic acid, trichloroacetic acid-tetrachloroethane mixtures, and trichloroacetic acid-chloroform mixtures.

In the production of the polyester fiber of the present invention, for example, a peripheral surface of a polyethylene terephthalic homopolymer precursory fiber is coated with an ethylene glycol-terephthalic acid, and isophthalic acid copolyester or an ethylene glycol and neopentyl glycol-terephthalic acid copolyester in the state of a melt or a solution in an organic solvent and the coating is solidified. In the resultant fiber, the skin portion consisting of the coating exhibits a poorer orientation and/or crystallinity than the core portion.

The polyester fibers of the present invention are useful in the form of loose fibers, a yarn, a cord, a nonwoven web, or a woven or knitted fabric as a reinforcing material for various rubber articles, for example, tires of small trucks and bias tires of large trucks and buses.

The rubber material is preferably selected from natural rubber and synthetic rubbers, for example, styrene-butadiene copolymer rubbers and polyisoprene rubbers.

The rubber articles can be produced by conventional methods wherein the reinforcing polyester fiber material is coated with an RFL (resorcinol-formaldehyde resin), the adhesive-coated polyester fiber material is embedded within a matrix consisting of a rubber material, the resultant mixture is shaped under pressure into a desired shape or form, and the resultant shaped mixture is vulcanized.

In the resultant rubber article, the reinforcing polyester fibers of the present invention exhibit excellent heat-resistance and bonding property to the rubber matrix.

The reasons for the excellent heat-resistance and bonding property of the polyester fibers of the present invention are not completely clear. However, it is presumed that since the skin portion of the fiber has a low orientation and/or crystallinity, water or amines in the rubber matrix penetrate and diffuse into and are held by the skin portion so that the penetration of water and amines into the core portion is prevented. That is, the core portion is protected from undesirable hydrolysis and aminolysis by the skin portion. Therefore, as a whole, the polyester fibers embedded in the rubber matrix exhibit an enhanced heat resistance and bonding property over a long period of time.

The present invention will be illustrated in detail by the following examples and comparative examples.

EXAMPLE 1 AND COMPARATIVE EXAMPLE 1

In Example 1, a polyethylene terephthalate homopolymer having an inherent viscosity of 1.0 determined in $\theta$-chlorophenol at a temperature of 25° C. was melt-spun and drawn in the ordinary manner to provide drawn polyester filaments having an entire thickness of 1000 denier, a tensile strength of 9.5 g/d, a birefringence of 0.195, and a crystallinity of 57%.

The drawn polyester filaments were exposed to a dichloroacetic acid atmosphere at a temperature of 50° C. for 20 hours to modify the surface portions of the fibers.

The skin portion of the filament was modified in an amount of 15% based on the entire weight of the filament and exhibited a decreased birefringence of 0.185 and a lowered crystallinity of 48%. The skin portion-modified polyester filaments exhibited a tensile strength of 9.2 g/d.

The skin-portion-modified polyester filaments were converted to a raw cord composed of two filaments and having a twist number of 49×49 turns/10 cm.

The cord was impregnated with RFL and then was heat-treated at a temperature of 210° C. for 2 minutes under tension.

A portion of the heat-treated cord was placed in a mold and embedded in a rubber material containing, as a main component, natural rubber.

The rubber material in the mold was vulcanized at a temperature of 170° C. under a pressure of 50 kg/cm$^2$ for 120 minutes.

Thereafter, the cord was withdrawn from the vulcanized rubber material.

The heat resistance of the cord in the rubber material was represented by the tensile strength ratio (X) calculated from the equation:

$$X(\%) = (B/A) \times 100$$

wherein A represents a tensile strength of the heat-treated cord and B represents a tensile strength of the cord withdrawn from the vulcanized rubber material.

Also, another portion of the heat-treated cord was placed in a mold and embedded in the same type of rubber material as mentioned above. The rubber material in the mold was vulcanized at a temperature of 150° C. under a pressure of 90 kg/cm$^2$ for 30 minutes. The resultant vulcanized article was measured for the bonding strength (C) of the cord to the rubber material.

The remaining portion of the heat-treated cord was subjected to the same bonding procedure as that mentioned above, except that the vulcanizing temperature was 170° C. and the vulcanizing time was 75 minutes. The resultant vulcanized article was measured for the bonding strength (D) of the cord to the rubber material.

The heat-resistant bonding property (Y) of the cord was represented by a bonding strength ratio D/C:

Y(%)=(D/C)×100 wherein C and D are as defined above.

The polyester filament cord exhibited a heat-resistance (X) of 70% and a heat-resistant bonding property (Y) of 75%. That is, the cord exhibited an excellent heat resistance in the rubber material and a satisfactory bonding property to the rubber material.

In Comparative Example 1, the same procedures as those described above were carried out except that no swelling treatment was applied to the drawn polyester filament. The resultant comparative cord in the rubber material exhibited a heat resistance (X) of 58% and a heat-resistant bonding property (Y) of 52%.

EXAMPLE 2

The same drawn polyester filaments as example 1 were used as precursory polyester core filaments.

A polyethylene terephthalate copolymer containing 10 molar% of isophthalic acid as an additional dicarboxylic acid component to terephthalic acid and having an inherent viscosity of 0.65 was dissolved in a concentration of 15% by weight in o-chlorophenol.

The resultant solution was coated in a dry amount of 7% by weight on the peripheries of the precursory polyester core filaments. The coated filaments were dried at a temperature of 150° C.

The resultant polyester filaments exhibited a tensile strength of 88 g/d. The skin portion was in an amount of 6% based on the entire weight of the filaments and had a crystallinity of 30%.

The resultant polyester filaments having a skin-core structure exhibited satisfactory heat resistance (X) of 63% and heat-resistant bonding property (Y) of 62%.

EXAMPLE 3

A polyethylene terephthalate homopolymer having an inherent viscosity of 1.2 was melt-spun and drawn in the ordinary manner. The resultant drawn polyester filaments exhibited an entire thickness of 1000 denier, a tensile strength of 12.2 g/d, a birefringence of 0.210, and a crystallinity of 63%.

The drawn polyester filaments were immersed in a mixture of the same weights of phenol and tetrachloroethane at a temperature of 20° C. for 24 hours, rinsed with water and then dried at a temperature of 25° C. for 48 hours, to modify the surface portions of the filaments.

The resultant skin portions of the modified filaments were in amount of 17% based on the weight of the filaments and exhibited a decreased birefringence of 0.180 and lowered crystallinity of 45%. The modified filaments had a tensile strength of 9.6 g/d.

The modified polyester filaments were converted to a heat-treated cord and subjected to the measurements of the heat resistance (X) and heat resistant bonding property (Y) in the same manner as described in Example 1. The cord exhibited an excellent heat resistance (X) of 72% and a superior heat-resistant bonding property (Y) of 76% in the rubber material.

I claim:

1. A reinforced rubber article comprising a rubber matrix and at least one reinforcing cord embedded in the rubber matrix and consisting of polyester fibers, each of which polyester fibers has a tensile strength of 8 g/d or more and is composed of a core portion consisting essentially of a polyethylene terephthalate homopolymer and a skin portion covering the core portion and consisting essentially of a member selected from the group consisting of copolyesters of ethylene glycol with terephthalic acid and isophthalic acid, and copolymers of ethylene glycol and neopentyl glycol with terephthalic acid, the skin portion being in an amount of 5% to 20% based on the entire weight of the fiber and having at least one of a lower degree of orientation and a lower degree of crystallinity than the core portion.

2. The rubber article as claimed in claim 1, wherein said polyester fiber has been produced by coating a precursor polyester fiber for the core portion with said copolyester resin for the skin portion.

3. The rubber article as claimed in claim 2, wherein said copolyester resin for the skin portion has been applied in the state of a solution or melt to said precursory polyester fiber for the core portion.

* * * * *